(12) United States Patent
Folk et al.

(10) Patent No.: US 8,181,856 B1
(45) Date of Patent: May 22, 2012

(54) CASH HANDLING DEVICE HAVING ALERT SYSTEM

(75) Inventors: Amy Baker Folk, Charlotte, NC (US); William Thomas Sanders, Denver, NC (US); Daniel Christopher Bohen, Charlotte, NC (US); Shane Anthony Johnson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 306 days.

(21) Appl. No.: 12/277,876

(22) Filed: Nov. 25, 2008

(51) Int. Cl.
*G06Q 40/00* (2006.01)
*G07D 11/00* (2006.01)
*G07F 19/00* (2006.01)

(52) U.S. Cl. ........... 235/379; 235/375; 235/487; 705/43
(58) Field of Classification Search .................. 235/379, 235/375, 381, 487; 705/43–45; 902/7, 11, 902/15
See application file for complete search history.

(56) References Cited

U.S. PATENT DOCUMENTS

| | | |
|---|---|---|
| 5,416,306 A | 5/1995 | Imahata |
| 5,708,422 A | 1/1998 | Blonder et al. |
| 5,725,081 A | 3/1998 | Meeker |
| 5,780,825 A | 7/1998 | Sato et al. |
| 5,918,720 A | 7/1999 | Robinson et al. |
| 6,047,270 A | 4/2000 | Joao et al. |
| 6,695,307 B2 | 2/2004 | Kanagawa |
| 7,942,315 B2 * | 5/2011 | He et al. .................. 235/379 |
| 8,019,663 B1 * | 9/2011 | Bohen et al. ............. 705/30 |
| 2002/0091648 A1 * | 7/2002 | Phillips et al. ........... 705/71 |
| 2002/0193102 A1 * | 12/2002 | Hyyppa et al. ........... 455/419 |
| 2004/0236691 A1 * | 11/2004 | Force et al. .............. 705/43 |
| 2005/0126960 A1 | 6/2005 | Aas |
| 2007/0244830 A1 | 10/2007 | Hilderman |
| 2008/0183480 A1 * | 7/2008 | Carlson et al. ............ 705/1 |
| 2008/0228602 A1 * | 9/2008 | Bauman et al. .......... 705/28 |
| 2008/0313061 A1 * | 12/2008 | Eugenio Donato Renato Limlengco ............... 705/30 |
| 2009/0081989 A1 * | 3/2009 | Wuhrer ..................... 455/406 |

* cited by examiner

*Primary Examiner* — Edwyn Labaze
(74) *Attorney, Agent, or Firm* — Banner & Witcoff, Ltd.; Michael A. Springs (57) ABSTRACT

A cash recycler or other currency handling device includes a cash handling device alert system. Upon occurrence of one or more triggering events, a notification will be sent to one or more responsible entities. The responsible entity may be specified by a user. In addition, a user may specify the frequency of transmission of the notification or alert. In some arrangements, the alert may include a request for acknowledgement from the responsible entity.

25 Claims, 10 Drawing Sheets

CASH HANDLING DEVICE HAVING ALERT SYSTEM

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow including cash recyclers which allow a retail establishment to maintain and re-use an amount of currency on-site. The cash recycler may further calculate and manage use of cash flows in real-time.

As cash handling devices, such as cash recyclers, are being used in more locations, i.e., retails stores, etc., there more opportunity for theft, malfunction, etc. Accordingly, there is an increased need for various responsible entities, such as the financial institution, manager of the retail store, and the like, to be aware of activity at the cash recycler.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this invention relate to notifications or alerts sent from a cash recycler to a responsible entity in response to the occurrence of a triggering event. For instance, the cash recycler may indicate that a triggering event, such as the cash recycler transitioning to tampering mode, a change in transport schedule, an employee attempting to withdraw funds beyond that employee's limit, and the like, has occurred. An alert or notification will then be sent to a predetermined responsible entity, such as the financial institution, transport carrier, manager of the retail store at which the cash handling device is located, etc. In some arrangements, an acknowledgement from the responsible entity may be requested with the notification or alert.

BRIEF DESCRIPTION OF THE DRAWINGS

The present disclosure is illustrated by way of example and not limited in the accompanying figures in which like reference numerals indicate similar elements.

The reader is advised that the attached drawings are not necessarily drawn to scale.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers, dispensing or depository machines and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
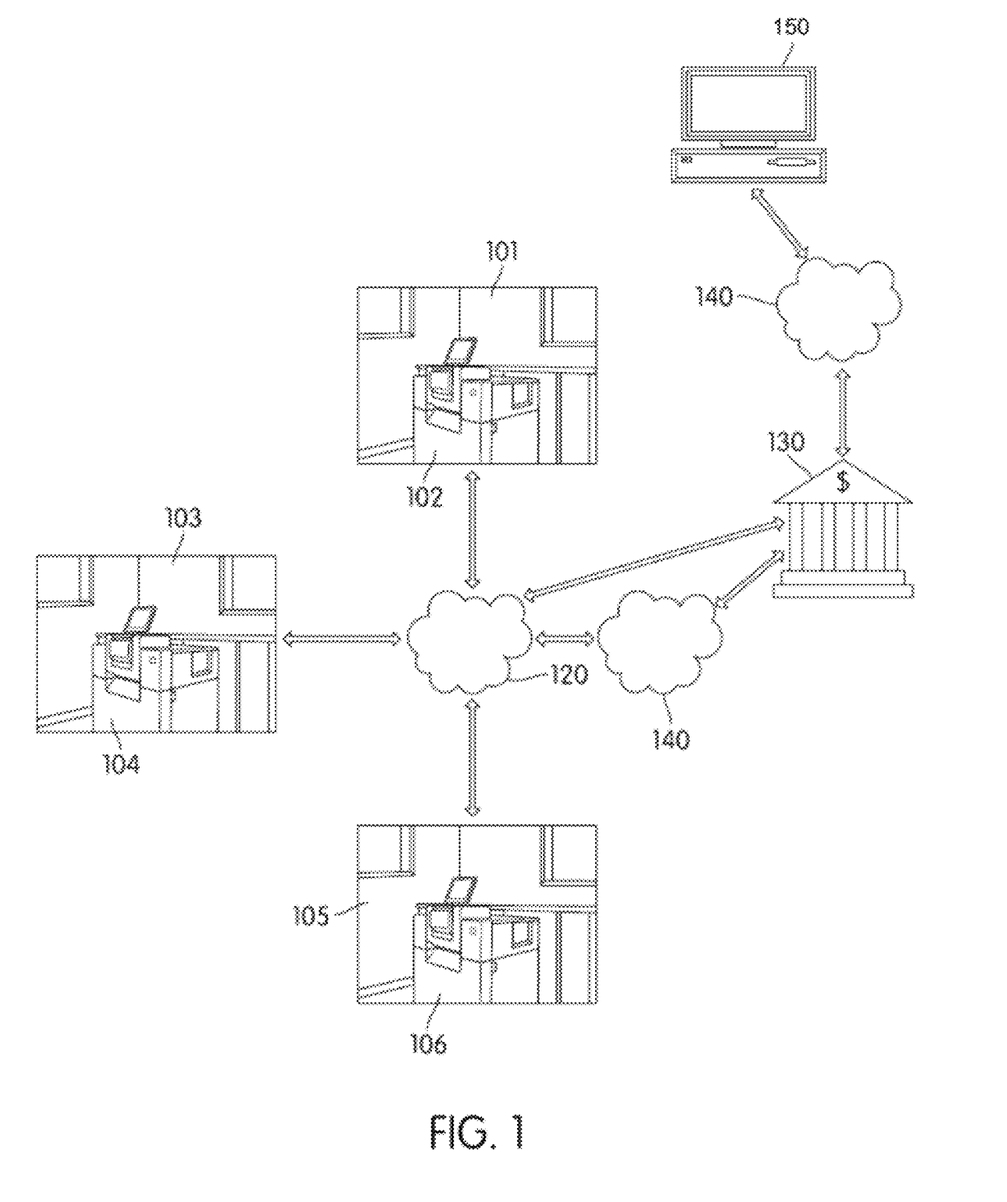
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
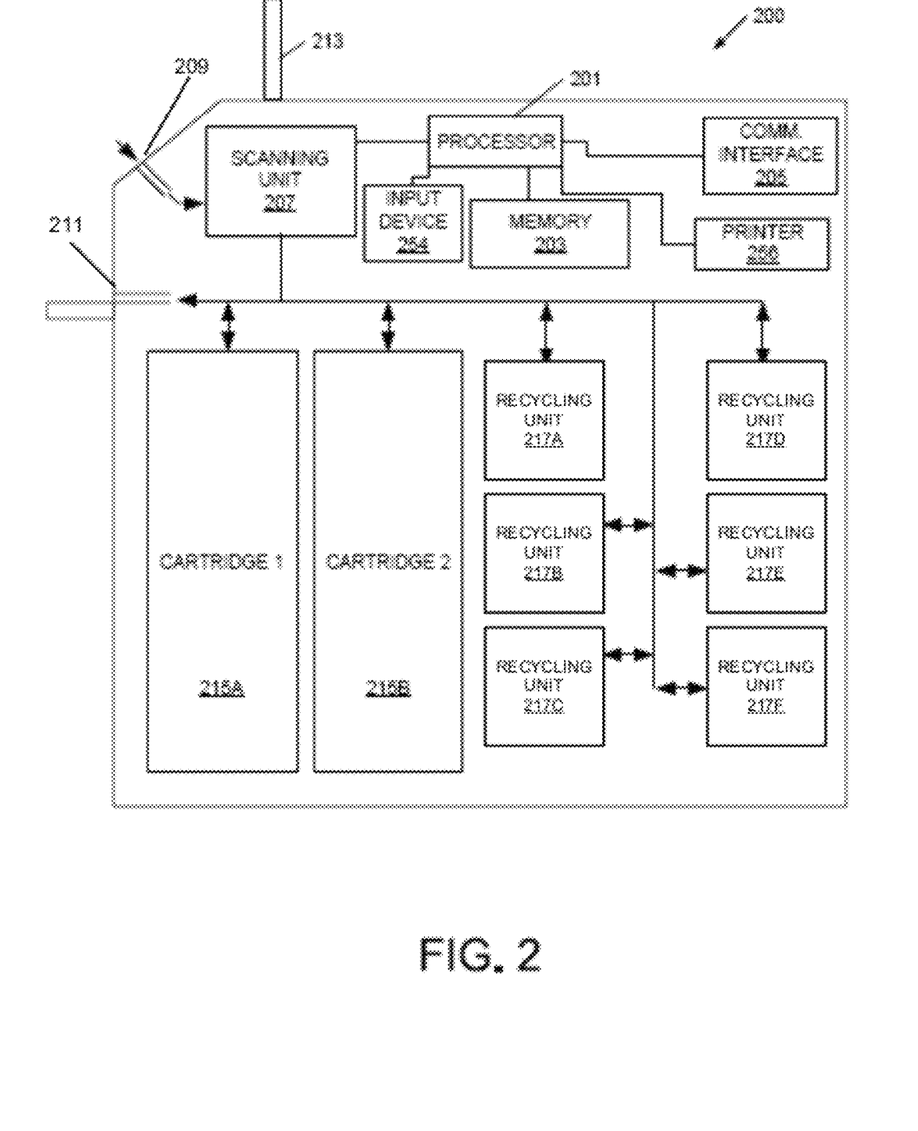
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and recycling units 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, recycling units 217 and cartridges 215 are configured to store currency. Currency may be inserted through input slot 209 and withdrawn through withdrawal slot 211. Recycling units 217, including stackers, rolled storage modules, and the like, may be used to store and organize currency based on denomination. For example, all $5 bills may be stored in recycling unit 2 (i.e., recycling unit 217B) while all $20 bills may be stored in recycling unit 3 (i.e., recycling unit 217C). Cartridges 215A and 215B, on the other hand, may be used to store overflow currency and/or currency for transport. Thus, if recycling units 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and recycling units 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203. In addition, scanning unit 207 may be configured to scan checks or other non-currency paper items, in addition to paper currency.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from recycling units 217 and directed into cartridge 215A for storage using a series of motorized rollers. In another example, currency stored in cartridge 215A may be withdrawn and organized and stored into recycling units 217 according to denomination. Using such systems to facilitate the automated movement of currency between storage components and other portions of recycler 200 may provide efficiency and security by alleviating some of the need to manually handle currency stored within recycler 200.

Figure 3:
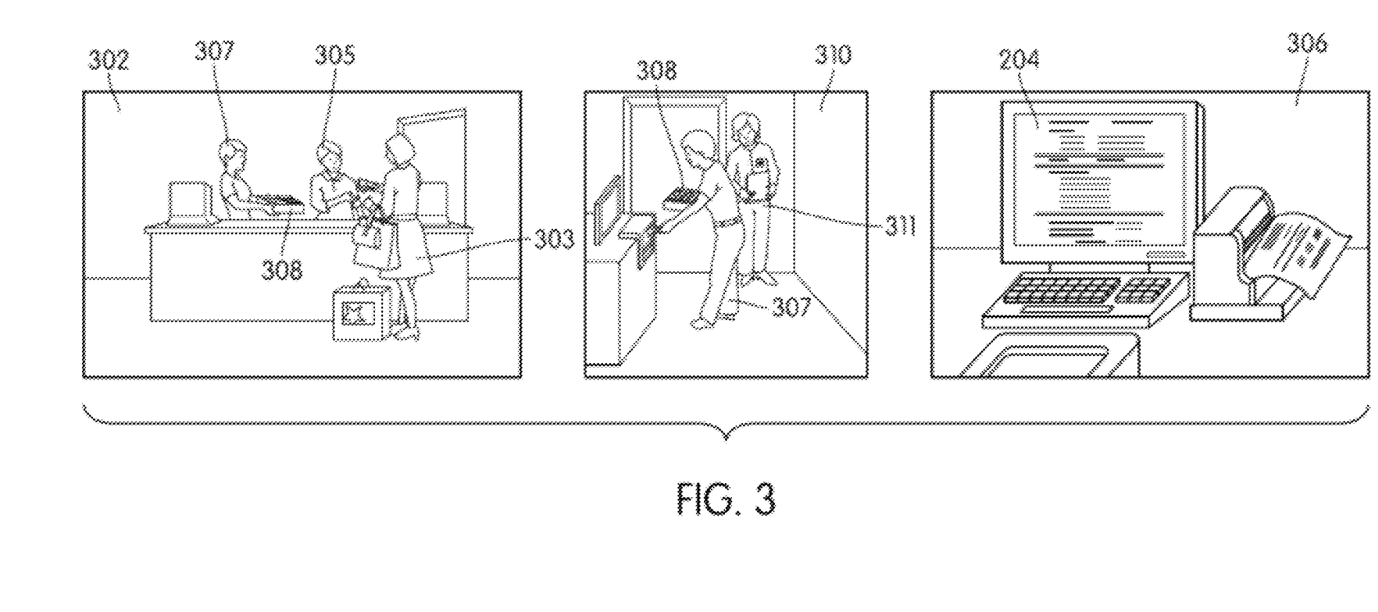
FIG. 3 illustrates various features of a currency recycler that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
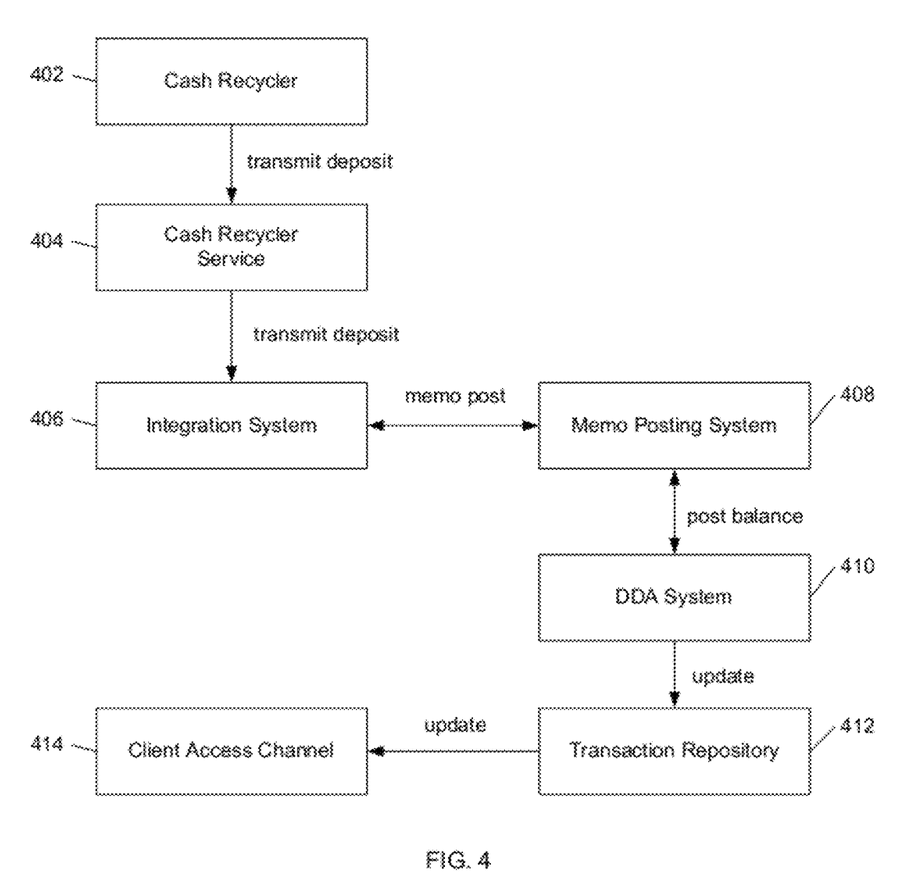
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
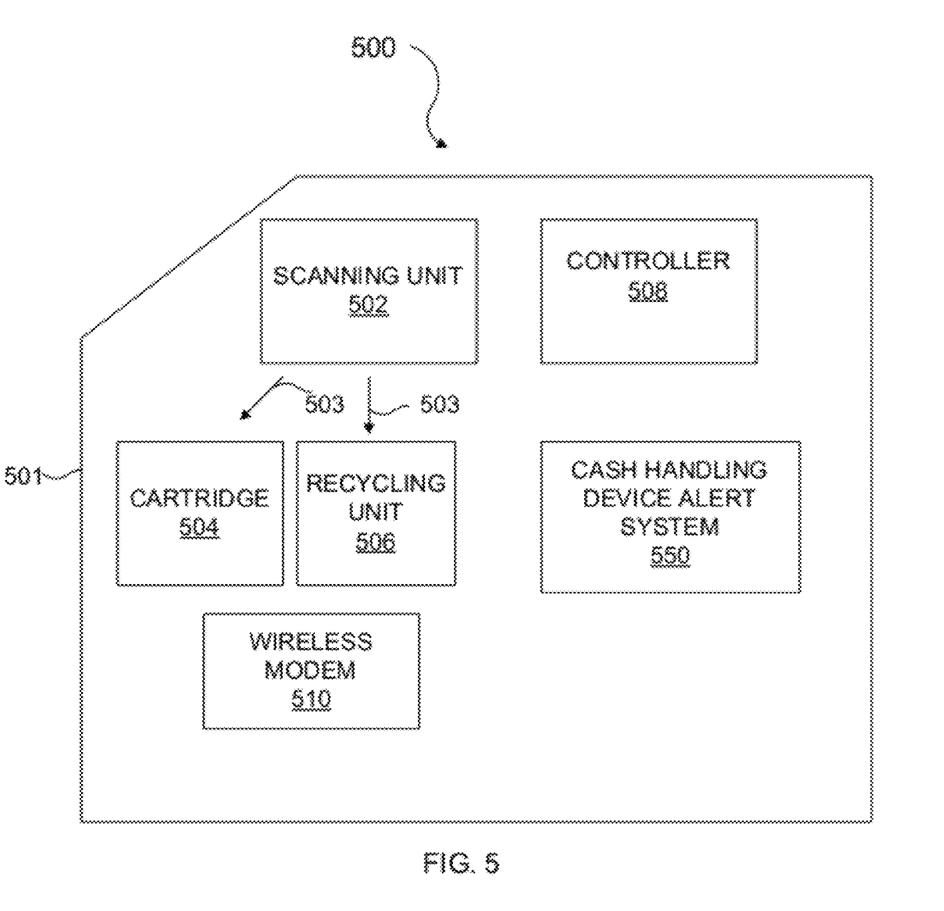
FIG. 5 is a simplified diagram of a currency recycler including various components used in accordance with one or more aspects described herein.

FIG. 5 illustrates one example cash recycler 500 having various components to simplify performance of the cash recycler 500 and improve efficiency of the cash recycler 500.

Figure 6:
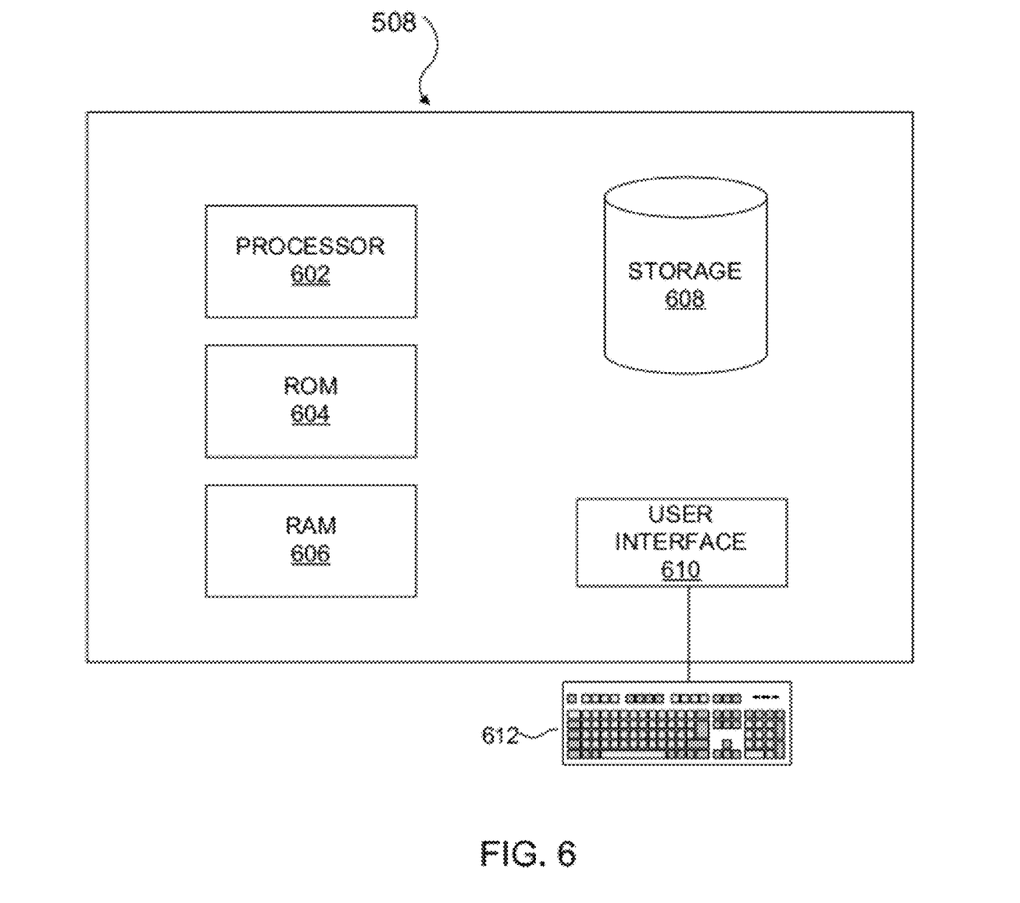
FIG. 6 is a simplified diagram of aspects of the cash recycler and controller of FIG. 5 in accordance with aspects described herein.

With further reference to FIG. 5, the cash recycler 500 or other currency handling device described above may include a controller 508. The cash recycler 500 may include some or all aspects of the cash recycler 200, as shown in FIG. 2. The controller is configured to control the operations of cash recycler 500, including processing transactions including transmitting data to a financial institution for recognition at the financial institution, controlling mechanical systems of the cash recycler 500, controlling access to one or more portions of recycler 500, reconciling logical and physical counts and the like. As shown in FIGS. 5 and 6, the controller 508 may be physically located within the housing of the cash recycler, e.g., as part of a cash recycler housing 501, or as a separate component. The controller 508 generally includes a processor 602. Controller 508 may further include memory such as RAM 606 and ROM 604. In addition, the controller may include or have access to storage 608 and a user interface 610. The user interface 610 may include a display as well as various input devices such as a keyboard 612, mouse, etc. In some arrangements, the display may be a touch-sensitive display thereby allowing user input to be received through the display. Additionally or alternatively, the user interface may be configured to receive voice commands. The controller may further be configured to control various peripheral devices, such as a printer, external storage device, and the like using one or more adapters and interfaces (not shown).

The controller 508 is configured to execute software for providing functionality to the cash recycler 500. For instance, the controller 508 executes commands as directed by the software to control transactions made using the currency recycler 500, communicate with the financial institution or other entity, provide outputs via the user interface 610 or a peripheral device, such as a printer, and also to physically move the currency within the cash recycler 500.

For example, a user may deposit $1000 into the cash recycler 500. The user provides input through the user interface 610 regarding the deposit. This user input may include selection from a display, voice commands, and the like. The money is then deposited into the cash recycler 500. In one arrangement, the controller 508, in response to various instructions provided by the software, may control the mechanical systems of the cash recycler 500, as well as the electronic (e.g., computer) systems of the cash recycler 500. For instance, the controller 508 may operate the mechanical system that controls the flow of currency into the machine during a deposit. In another arrangement, the controller 508 may house the software configured to send and receive instructions to an additional driver or controller that controls the flow of currency. These mechanical systems are not shown in the figures but are indicated by arrows 503. In addition, the controller 508 controls the scanning device 502 to scan each bill inserted into the cash recycler 500 to confirm authenticity and to verify the condition of the bill. If a bill is deemed counterfeit it will be removed from circulation and stored in a separate region of the cash recycler 500. The controller 508 will engage various mechanical systems to store the bill in the separate region. If the bill is deemed too worn to be returned to circulation, the mechanical systems run by the controller 508 will remove the bill and place it in a separate region for storage. If the bill is deemed suitable to return to circulation it will remain with the bills in the recycler 500 that may be withdrawn from the recycler 500. Further, controller 508 may reconcile a deposit amount specified by a depositing user and a physical count of the currency actually deposited to insure accuracy and integrity. In addition, the controller 508 will store data related to the amount of currency inserted into the cash recycler 500, as well as the amount of currency removed from circulation for various reasons. In still other examples, the controller 508 may aid in transmitting the cash transaction information to the financial institution. Additionally or alternatively, the controller 508 may forward a communication, such as an email, to an email box reporting the cash transaction. In still other arrangements, the controller 508 may forward a report of the cash transaction to a peripheral device, such as a printer, to print the report as a record of the cash transaction.

In some arrangements, the cash recycler 500 may be a hardened device. That is, the cash recycler 500, along with controller 508, may be constructed in a secure manner such that cash recycler 500 and controller 508 might not be easily reconfigured. For example, a controller such as controller 508 may be integrated into cash recycler 500 using application specific circuits, dedicated hardware connections and components and the like that might not be easily disrupted or reconfigured. This may prevent intruders from hacking into the cash recycler system by, e.g., merely disconnecting an external controller.

Additionally or alternatively, access to the various functions of the cash recycler 500 may be password protected or may require other authorization and authentication before a user may perform or adjust those functions. In one arrangement, biometric data, such as fingerprint, iris scan, and the like, may be used to authenticate a user of the cash recycler 500 to permit adjustment to various settings. In addition, access to the internal portion of the cash recycler 500 may be restricted to only authorized users. The cash recycler 500 may include one or more locks to prevent unauthorized access to the internal portion of the cash recycler 500. Integrating the controller 508 within the cash recycler 500 provides such additional security to prevent unauthorized access to the computer systems and internal portion of the cash recycler 500 and reduces the ability of would-be intruders to hack into the controller 508 and bypass such security measures.

With further reference to FIG. 5, the cash handling device 500 may include a cash handling device alert system 550. The cash handling device alert system may be integrated into the cash handling device or, in some arrangements, may be a separate component. The cash handling device alert system 550 may be configured to communicate various notifications, alerts, etc. to a responsible entity upon occurrence of a triggering event. For instance, the cash handling device alert system 550 may be configured to send a notification to a financial institution, central server at a retail location at which the cash handling device is located, retail store manager at which the cash handling device is located, an armored carrier, etc. The notification/alert may be transmitted to some or all of the responsible entities and the entities to be notified may be specified by a user.

Various triggering events may initiate sending of the notification or alert. For instance, the cash handling device 500 being sent into tampering mode may be a triggering event. An employee attempting a withdrawal above the predetermined withdrawal limit for that employee may also be a triggering event. In addition, a request for replenishment of one or more storage units within the cash handling device, a change in the transportation schedule for funds to/from the cash handling device, etc. may all be triggering events.

The notification or alert may be sent via short messaging service, email, and the like. For instance, a notification may be a text message sent to the mobile device, such as a cell phone, of a manager of a retail store at which the cash handling device is located. In some arrangements, the notification or alert may also be sent to the cash handling device 500 and may appear on the display of the cash handling device 500.

Figure 7:
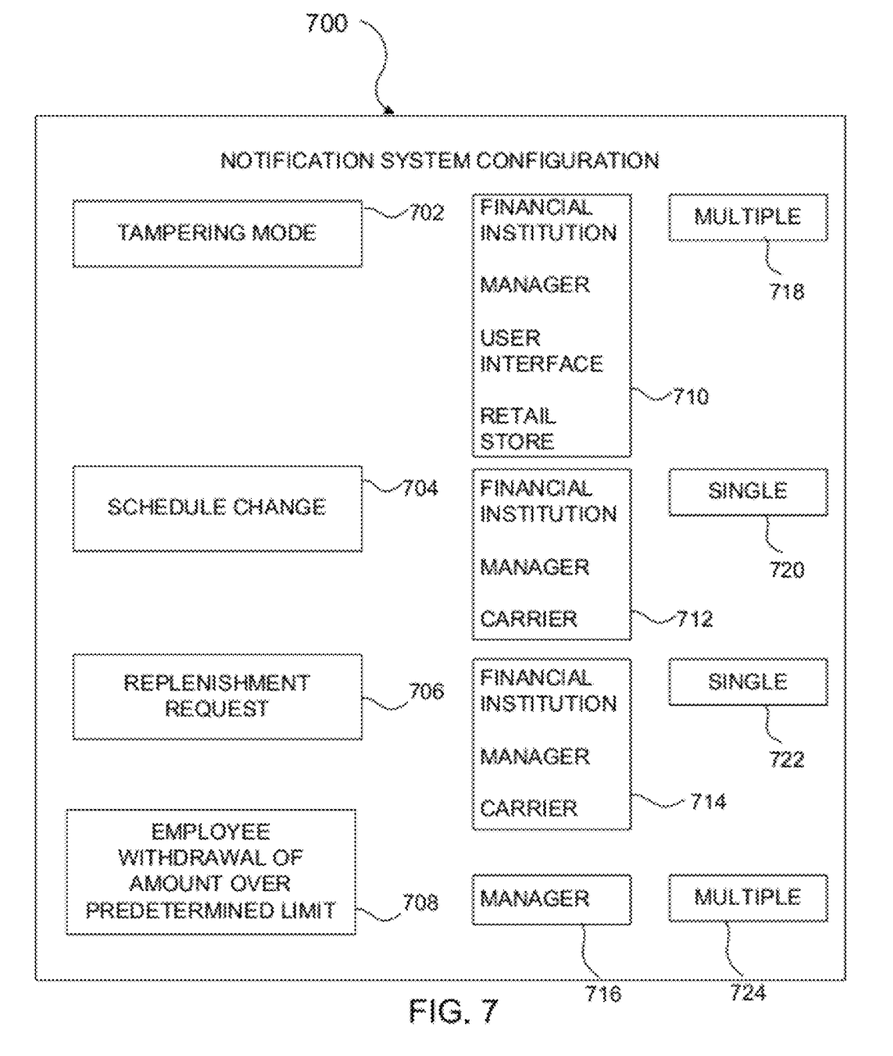
FIG. 7 is an example user interface for configuring various aspects and functions of the cash handling device alert system in accordance with aspects described herein.

FIG. 7 illustrates one example user interface 700 in which various notification settings may be specified by a user. For instance, various fields 702, 704, 706, 708 may be provided in which a user may select the triggering event that will prompt sending of the notification/alert. User interface 700 includes fields for specifying notification information for the cash handling device going into tampering mode 702, a change in the transportation schedule 704, a request for replenishment 706 and an employee attempting a withdrawal beyond the predetermined limit for that employee 708. Additional or alternative triggering events may be included in the user interface 700. In addition, a scroll bar (not shown) may be provided to permit viewing of additional triggering events that are not visible on the user interface 700 as shown.

Selection of the triggering event may be performed using known methods of selection. For instance, a user may click or double-click one of fields 702, 704, 706, 708 and type in the triggering event. In other arrangements, the user may select the triggering event from a drop down menu of available triggering events. In still other arrangements the user may select a radio button associated with the triggering event he/she is selecting. Other known methods of selection may also be used with user interface 700.

Upon identifying and selecting the triggering events to be configured, the user may then configure various features or aspects of each triggering event. For instance, the user may select, in regions 710, 712, 714, 716, the one or more responsible entities that will be notified upon occurrence of the triggering event. For instance, in the case of a change in transportation schedule 704, the financial institution, transport carrier and manager of the retail store will be notified, as shown in region 712. Additionally or alternatively, the user may specify, in fields 718, 720, 722, 724, the number of times a notification or alert will be sent. For instance, a user may select to have an alert sent to the responsible entity a single time or multiple times. In some arrangements, the user may be able to specify the number of times a notification will be sent. In other arrangements, the notification may be sent a default number of multiple times.

In some arrangements, a user may be able to specify a priority associated with each triggering event. For instance, one of a high or low priority may be set for each triggering event. Alternatively, a first (highest), second (middle) or third (lowest) priority may be assigned to each triggering event. The user may then configured how alerts are sent, to whom they are sent and how often they are sent based on the priority of the triggering event, rather than each triggering event individually. For instance, an indication of a device entering a tampering mode or an employee attempting to withdraw funds beyond the employee's limit may be a high priority. The user may specify that high priority triggering events include notifications sent via email and short messaging service (SMS), that the alert should be sent multiple times, i.e., every two minutes, and that acknowledgement of the alert is required from the responsible entity. Additionally or alternatively, the user may specify that a request for replenishment and/or schedule change are low or medium priority triggering events and an alert may be sent to the financial institution, manager and transport carrier once with no acknowledgement required.

Figure 8:
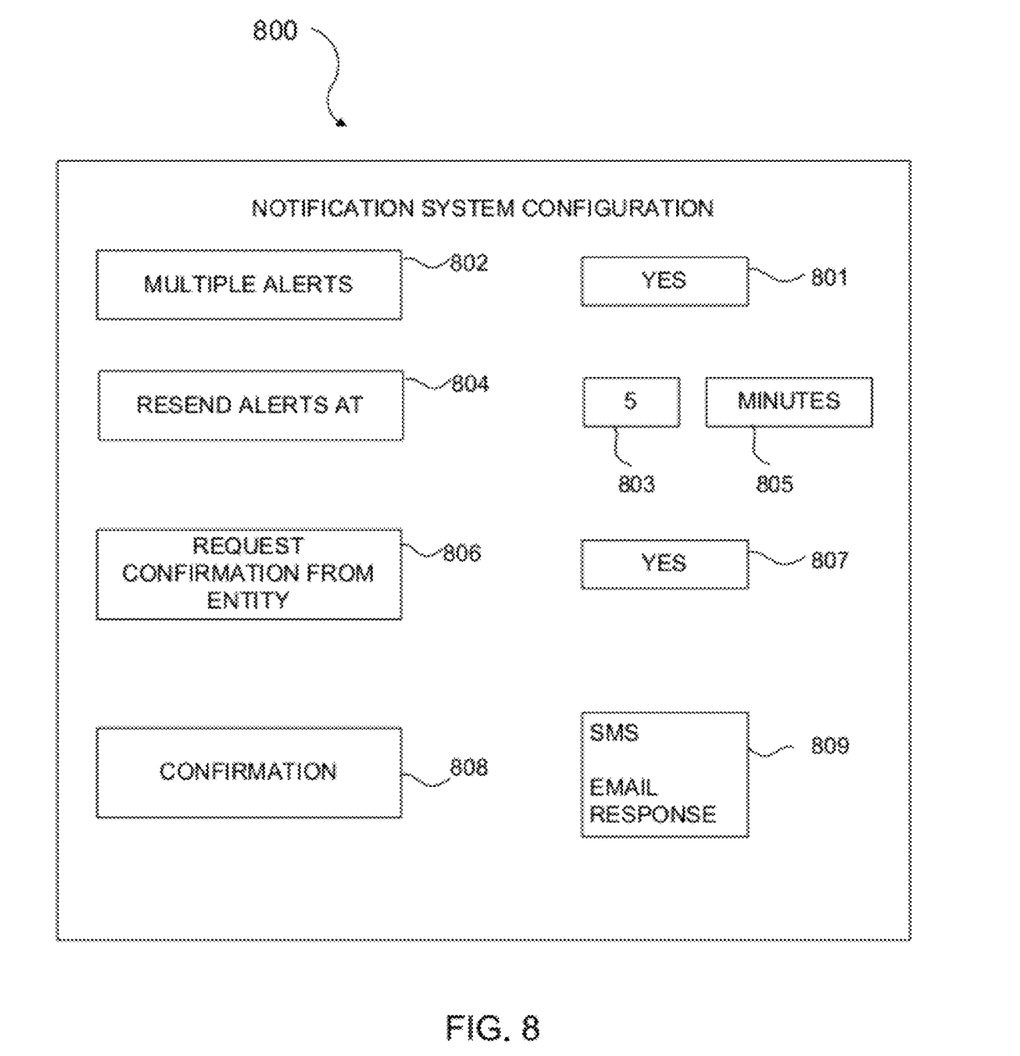
FIG. 8 illustrates another example user interface for configuring additional aspects and functions of the cash handling device alert system in accordance with aspects described herein.

FIG. 8 illustrates another example user interface 800 for configuring various aspects and features of the cash handling device alert system. For instance, in field 802 a user may specify whether alerts will be sent once or if multiple alerts are enabled. As shown, multiple alerts are enabled in field 801. In addition, a user may specify the interval at which multiple alerts may be sent in field 804. For instance, a user may specify that multiple alerts be sent at intervals of five minutes (i.e., a frequency), as shown in fields 803 and 805. In one example, alerts for robberies, may be sent more frequently (e.g., every 20 seconds), while alerts for schedule changes, which may be less urgent or important as compared to robberies, may be sent once every 3 minutes. The user may specify both the number, as shown in region 803, and units, as shown in field 805. For instance, the user may select any number of seconds, minutes, hours, days, etc.

Additionally or alternatively, a user may specify, in fields 806 and 807, whether an acknowledgement request will be sent with the alert or notification. For instance, upon sending an alert, the message may include a request for the responsible entity to communicate back to the cash handling device a confirmation of receipt of the alert. The confirmation may be sent via short messaging service, email, etc., as shown in fields 808 and 809. In some arrangements, the notification or alert may be sent to the responsible entity at regular intervals until the acknowledgement is received at the cash handling device.

Figure 9:
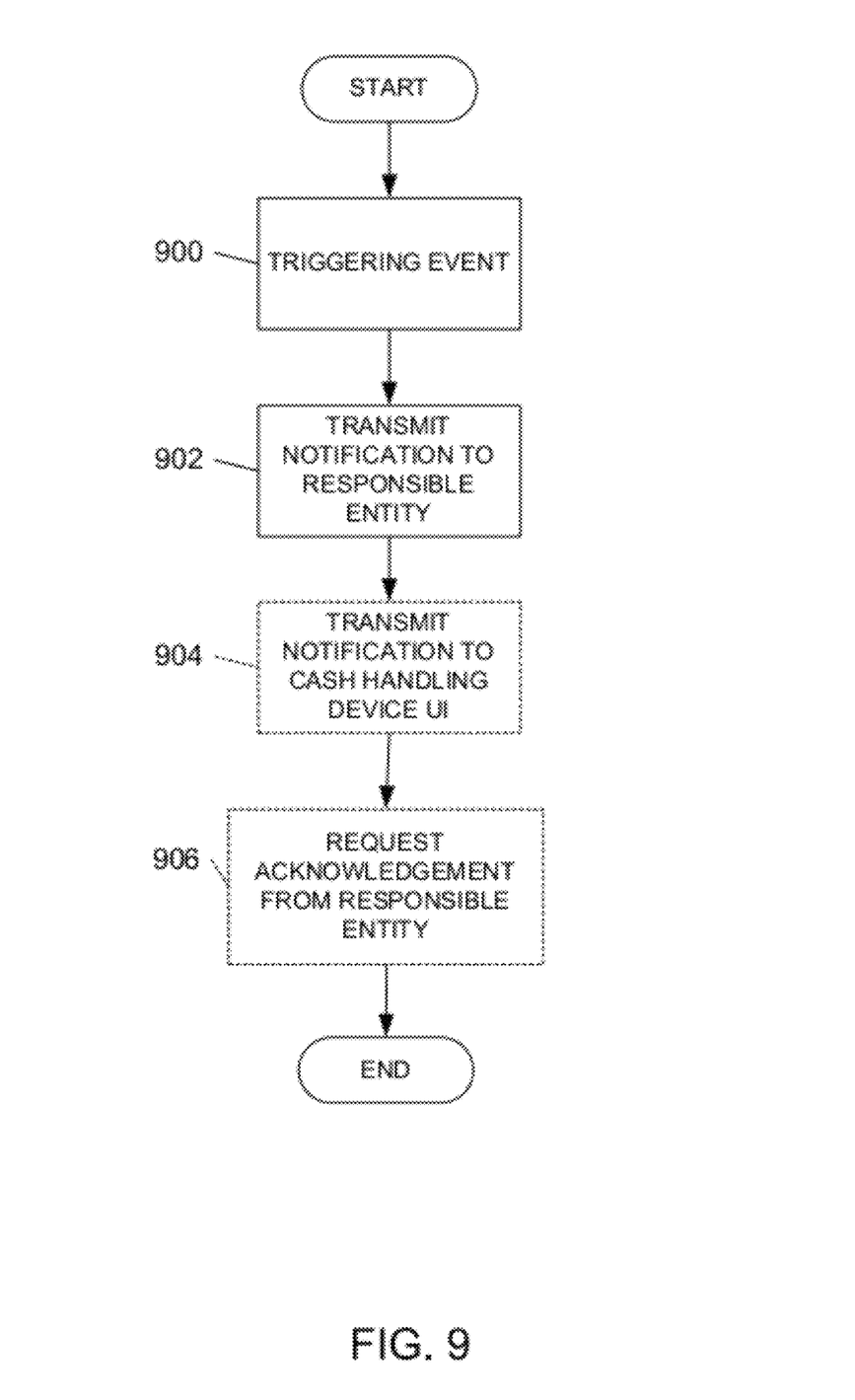
FIG. 9 illustrates one example method of sending notifications or alerts via the cash handling device alert system in accordance with aspects described herein.

FIG. 9 illustrates one example method of transmitting alerts via the cash handling device alert system. In step 900, a triggering event occurs at the cash handling device. As discussed above, the triggering event may be one or more of the cash handling device transitioning to tampering mode, a replenishment request, a change in the transportation schedule, an employee attempting to withdraw funds greater than that employee's withdrawal limit, and the like. In step 902, a notification or alert of the triggering event is transmitted to the responsible entity. In some arrangements, one or more responsible entities may be specified by a user. Optionally, in step 904, a notification of the triggering event may be transmitted to the cash handling device as well. In some arrangements, a request for acknowledgement of receipt of the notification will be sent with the notification, as shown in optional step 906.

In some arrangements, the triggering event may also result in an adjustment in operation of the cash handling device. For instance, when a tampering mode alert is transmitted, the controller may also lock down the cash handling device, i.e., prevent any further transactions, etc. This and other alternate arrangements are described more fully in U.S. patent application Ser. No. 12/212,450, filed Sep. 17, 2008, which is incorporated herein in its entirety by reference. In another example, upon receiving an indication of the employee attempting to withdraw funds beyond that employee's limit, the controller may prevent any additional transactions by that employee or even may prevent any transactions until an acknowledgement of the alert that an employee attempted to withdraw an amount which is beyond a predetermined limit is received.

Figure 10:
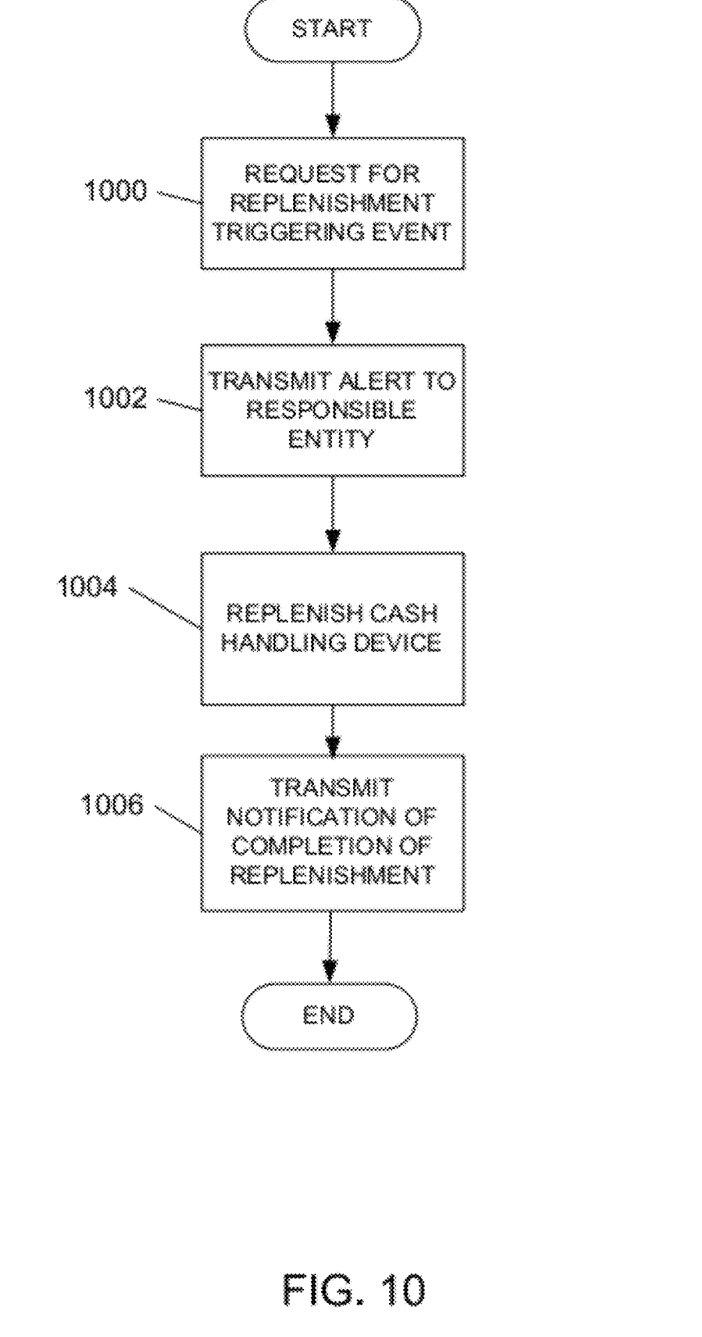
FIG. 10 illustrates another example method of transmitting notifications or alerts via the cash handling device alert system in accordance with aspects described herein.

FIG. 10 illustrates another example method of transmitting alerts in response to a triggering event, such as a request for replenishment. In step 1000, a need for replenishment of cash in the cash handling device occurs. In step 1002, an alert indicating the need for replenishment is transmitted to the one or more responsible entities. For instance, a replenishment request may be transmitted to the financial institution, transport carrier, and manager of the retail store at which the cash handling device is located. In step 1004 replenishment of the cash handling device is completed. In step 1006, an alert or notification of completion of the replenishment is transmitted to the responsible entity or entities.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method of communicating notifications of a cash handling device, comprising:
   receiving, by a cash handling device alert system, an indication that a triggering event has occurred at the cash handling device, the cash handling device being a cash recycler configured to receive cash, including at least one currency note, and dispense cash, including the received at least one currency note;
   transmitting, by the cash handling device alert system, a first notification of the triggering event to a responsible entity;
   transmitting, by the cash handling device alert system, a second notification of the triggering event to the cash handling device;
   determining, by the cash handling device alert system, a priority associated with the triggering event; and
   transmitting, by the cash handling device alert system, at least a third notification of the triggering event to the responsible entity if the determined priority associated with the triggering event is equal to a predetermined value.

2. The method of claim 1, wherein the triggering event is at least one of the cash handling device transitioning into mode, confirmation of delivery of a change order, an employee attempt to surpass a withdrawal threshold, a change to a transportation schedule, an on-demand request for transport, and an on-demand request for replenishment.

3. The method of claim 1, wherein the responsible entity is at least one of a financial institution, central server at a retail store in which the cash handling device is located, and a manager of the retail store in which the cash handling device is located.

4. The method of claim 1, wherein the first notification is a short messaging service message.

5. The method of claim 4, wherein the short messaging service message is transmitted to a cellular phone of the responsible entity.

6. The method of claim 1, wherein the first notification is an email message.

7. The method of claim 1, further including requesting acknowledgement of receipt of the first notification from the responsible entity.

8. The method of claim 1, wherein a cash handling device alert system is integrated into the cash handling device.

9. The method of claim 1, further comprising:
   receiving, by a cash handling device alert system, an indication that a plurality of triggering events have occurred at the cash handling device.

10. The method of claim 9, further comprising:
    determining, by a cash handling device alert system, a priority associated with each of the plurality of triggering events.

11. The method of claim 10, wherein each of the plurality of triggering events is assigned a first priority, a second priority, or a third priority, and wherein a transmission of a notification for each of the plurality of triggering events is based on the assigned priority.

12. A method of communicating notifications of a cash handling device, comprising:
    receiving, by a cash handling device alert system, an indication that a triggering event has occurred at the cash handling device, the cash handling device being a cash recycler configured to receive cash, including at least one currency note, and dispense cash, including the received at least one currency note;
    transmitting, by the cash handling device alert system, a first notification to a responsible entity of the triggering event;
    determining, by the cash handling device alert system, a priority associated with the triggering event;
    transmitting, by the cash handling device alert system, at least a second notification of the triggering event to the responsible entity if the determined priority associated with the triggering event is equal to a predetermined value;

adjusting the cash handling device to correct the triggering event;
receiving, by the cash handling device alert system, an indication that the triggering event has been corrected; and
transmitting, by the cash handling device alert system, a third notification to the responsible entity of the correction of the triggering event.

13. The method of claim 12, wherein the triggering event is at least one of the cash handling device transitioning to tampering mode, a request for replenishment of funds, an employee attempting to withdraw funds beyond the employee's limit, and a change to transportation schedule.

14. The method of claim 12, wherein the responsible entity is at least one of a financial institution, manager of a retail store at which the cash handling device is located, and transport carrier.

15. The method of claim 12, wherein the first notification is a short messaging service message sent to a mobile device.

16. The method of claim 12, wherein the first notification is an email message.

17. The method of claim 12, wherein the third notification is at least one of a short messaging service message and an email message.

18. The method of claim 12, wherein the responsible entity is based on user input.

19. One or more non-transitory computer-readable media storing computer executable instructions that, when executed, cause an apparatus to perform:
receiving an indication that a triggering event has occurred at a cash handling device, the cash handling device being a cash recycler configured to receive cash, including at least one currency note, and dispense cash, including the received at least one currency note;
transmitting a first notification to a responsible entity of the triggering event;
determining a priority associated with the triggering event; and
transmitting at least a second notification of the triggering event to the responsible entity if the determined priority associated with the triggering event is equal to a predetermined value adjusting the cash handling device to correct the triggering event;
receiving an indication that the triggering event has been corrected; and
transmitting a third notification to the responsible entity of the correction of the triggering event.

20. The one or more computer-readable media of claim 19, wherein the triggering event is at least one of the cash handling device transitioning to tampering mode, a request for replenishment of funds, an employee attempting to withdraw funds beyond the employee's limit, and a change to transportation schedule.

21. The one or more computer-readable media of claim 19, wherein the responsible entity is at least one of a financial institution, manager of a retail store at which the cash handling device is located, and transport carrier.

22. The one or more computer-readable media of claim 19, wherein the first notification is a short messaging service message sent to a mobile device.

23. The one or more computer-readable media of claim 19, wherein the first notification is an email message.

24. The one or more computer-readable media of claim 19, wherein the third notification is at least one of a short messaging service message and an email message.

25. The one or more computer-readable media of claim 19, wherein the responsible entity is based on user input.

* * * * *

UNITED STATES PATENT AND TRADEMARK OFFICE
CERTIFICATE OF CORRECTION

PATENT NO. : 8,181,856 B1
APPLICATION NO. : 12/277876
DATED : May 22, 2012
INVENTOR(S) : Amy Baker Folk et al.

Page 1 of 1

It is certified that error appears in the above-identified patent and that said Letters Patent is hereby corrected as shown below:

In Column 10, Claim 2, Line 15:
Please replace "into mode" with --into tampering mode--

Signed and Sealed this
Eleventh Day of September, 2012

David J. Kappos
*Director of the United States Patent and Trademark Office*